United States Patent [19]

Kaus et al.

[11] Patent Number: 5,307,220
[45] Date of Patent: Apr. 26, 1994

[54] A MAGNETIC-TAPE-CASSETTE APPARATUS HAVING IMPROVED TAPE-GUIDE DEVICE

[75] Inventors: Rainer Kaus, Hochheim; Dieter Gause, Weiterstadt; Reinhard Weber, Reinheim; Werner Maack, Seeheim, all of Fed. Rep. of Germany

[73] Assignee: U.S. Philips Corporation, New York, N.Y.

[21] Appl. No.: 914,372

[22] Filed: Jul. 15, 1992

[30] Foreign Application Priority Data

Jul. 27, 1991 [DE] Fed. Rep. of Germany ....... 4124957

[51] Int. Cl.⁵ .............................................. G11B 5/027
[52] U.S. Cl. ...................................................... 360/85
[58] Field of Search ...................................... 360/85, 95

[56] References Cited

U.S. PATENT DOCUMENTS 4,323,936  4/1982  Beitler ..................................... 360/85
4,626,938  12/1986  Umeda ..................................... 360/85

FOREIGN PATENT DOCUMENTS 0024361  6/1980  European Pat. Off. .
3025465  1/1983  Fed. Rep. of Germany .
3729661  3/1989  Fed. Rep. of Germany .

Primary Examiner—A. J. Heinz
Attorney, Agent, or Firm—Brian J. Wieghaus

[57] ABSTRACT

A magnetic-tape-cassette apparatus includes a tape-loading device having supports (17, 18) which are longitudinally movable on guide members (19, 20) and are caused to perform oppositely directed synchronous movements by means of two traction-means drives (29 to 34) for the purpose of threading a magnetic tape (4). The two traction-means drives (29 to 34) are mechanically coupled by a third traction-means drive (35). Toothed belts (31, 34, 35) used as traction means are driven by a torque generated by an electric motor (36).

17 Claims, 1 Drawing Sheet

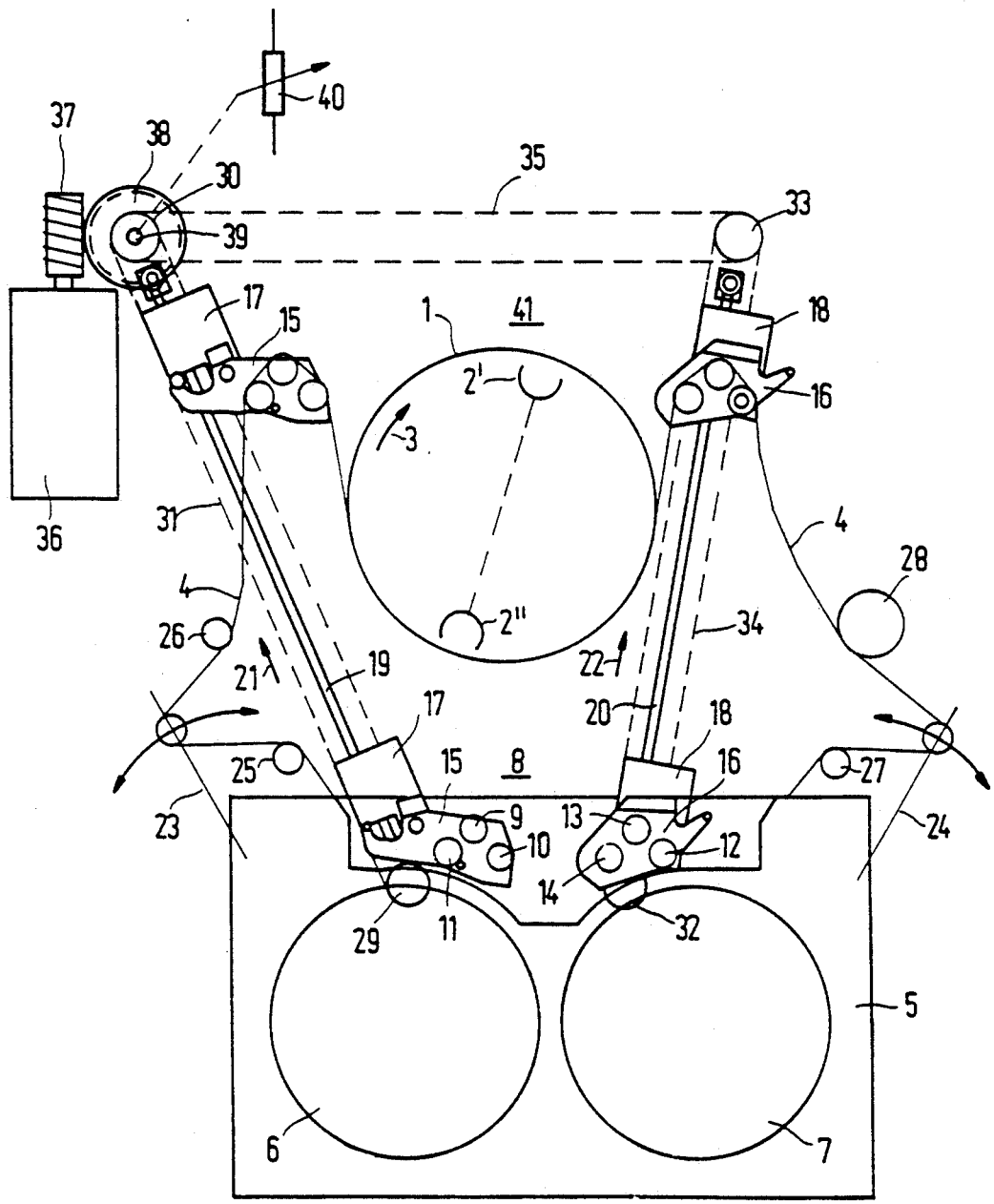

A MAGNETIC-TAPE-CASSETTE APPARATUS HAVING IMPROVED TAPE-GUIDE DEVICE

BACKGROUND OF THE INVENTION

The invention relates to a tape-guide device for a magnetic-tape-cassette apparatus having a drum-shaped scanning device comprising a rotary magnetic head, first and second elongate guide members, and a tape-loading device comprising two supports having tape-guide elements engageable behind a magnetic tape accommodated in a magnetic-tape cassette, said supports being longitudinally moveable on said guide members to extract the tape from the magnetic-tape cassette and wrap it at least partly around the drum-shaped scanning device.

Such a tape-guide device is known from DE 37 29 661 A1. Supports carrying tape-guide elements are guided by two guide members arranged to the left and the right of a scanning device, two flexible metal bands of rectangular cross-section being in sliding engagement at the inner and the outer radius of each guide member. Supports secured to ends of the metal bands can be moved along the guide path of the guide member by winding or unwinding the metal bands.

Moreover, EP 0.024,361 B1 discloses a tape-guide device comprising a wire-drive device for moving two tape-guide supports, which wire-drive device comprises a rotatable wire drum and two wires which each act on one of the two tape-guide supports substantially in the direction of movement of the support from a rest position to an operating position. The wires are guided by a plurality of wire drums and are passed through two trough-shaped guide members.

In addition, DE 30 25 465 C2 discloses a magnetic-tape extraction device for a cassette recorder, in which the guides comprise at least one guide slot having an arcuate shape and extending from one side of the drum-shaped scanning device to the opposite side of the drum-shaped scanning device via the cassette holder section. The tape draw-in device is connected to a strip-shaped guide member, the strip-shaped guide member having an elongate continuously arcuate shape corresponding to the arcuate shape of the guide slot and engages the guide slot so as to be longitudinally movable therein. The strip-shaped guide member is deformable to adapt to the shape of the guide slot. The strip-shaped guide member is driven by a driving device.

The known devices have the drawback that the relevant loading mechanisms require the use of a large number of complicated parts, some of which can be manufactured only by intricate production methods.

SUMMARY OF THE INVENTION

It is the object of the present invention to provide a tape-guide device of the type mentioned in the opening sentence, whose loading mechanism is of simple construction and which guides the magnetic tape exactly.

This object is achieved in that a magnetic tape apparatus of the type described in the opening paragraph is characterized by a first traction drive means with positive transmission, said first drive means comprising a first driving wheel and a first driven wheel arranged at ends of the first guide member and a first traction means which extends between the first driving wheel and the first driven wheel and is positively coupled to one of the longitudinally movable supports, a second traction drive means with positive transmission, said second drive means comprising a second driving wheel and a second driven wheel arranged at ends of the second guide member and a second traction means which extends between the second driving wheel and the second driven wheel and is positively coupled to the other one of the two longitudinally movable supports, and a third traction drive means with positive transmission, in which a third traction means drives a driving wheel one of the first and second traction drive means, and a motor for transmitting a torque to one of the driving wheels.

The tape-guide device in accordance with the invention has the advantage that the supports which are longitudinally movable on two guide members perform oppositely directed synchronous movement during threading of the magnetic tape owing to the use of three mechanically coupled traction-means drives with positive transmission, for example three toothed-chain drives, driven by a single motor. A further advantage is that this type of threading mechanism does not require much space.

Advantageous modifications and improvements of the tape-guide device claimed in Claim 1 can be realised by means of the steps defined in the subsidiary Claims. A particularly advantageous feature is that the position of the longitudinally movable support on the relevant guide member can be determined by a potentiometer driven by the threading mechanism.

BRIEF DESCRIPTION OF THE DRAWING

An embodiment of the invention will now be described in more detail, by way of example, with reference to the accompanying drawing. The drawing shows a diagrammatic plan view of a magnetic-tape threading mechanism with the parts which are relevant to the invention.

DESCRIPTION OF THE PREFERRED EMBODIMENT

In the drawing the reference numeral 1 denotes a drum-shaped scanning device comprising a rotary head disc carrying magnetic heads 2', 2" at its periphery. The head disc rotates in the direction indicated by an arrow 3. A magnetic tape 4 is partly wrapped around the drum-shaped scanning device 1. The magnetic tape 4 is accommodated in a magnetic-tape cassette 5 comprising a supply reel 6 and a take-up reel 7. Tape-guide elements 9, 10, 11 or 12, 13, 14 engage behind the magnetic tape 4 at the location of the cassette mouth 8. The tape-guide elements 9, 10, 11, which are constituted by rollers and/or pins, are arranged on a pivotable roller plate 15. The tape-guide elements 12, 13, 14, which are also constituted by rollers and/or pins, are arranged on a pivotable roller plate 16. Each of the roller plates 15, 16 is carried by a slide-type support 17 or 18 which is slidable on a rail-like guide member 19 or 20.

During threading-in the magnetic tape 4, behind which the tape-guide elements 9 to 14 engage, is extracted from the magnetic-tape cassette 5 and is led in the directions indicated by the arrows 21 and 22. Concurrently with this operation tape-traction levers 23 and 24 pass the magnetic tape 4 around stationary rollers 25, 26 and 27 arranged in the tape-guide path. The transport speed of the tape is determined in a manner known per se by a capstan 28 which is in contact with the magnetic tape 4.

At each of its ends the rail-like guide member 19 carries a chain wheel 30 or 29 to function as a driving wheel and a driven wheel respectively, between which wheels a first drive chain 31 extends. The drive chain 31 can be, for example, a toothed belt. The driven wheel guiding the drive chain 31 can be formed by a guide roller or guide wheel instead of by the chain wheel 29. The guide member 19 is positively coupled to the left-hand part of the first drive chain 31.

A second toothed-chain drive similar to the first toothed-chain drive is arranged to the right of the drum-shaped scanning device 1 and comprises two chain wheels 33 and 32 arranged at the ends of the guide member 20 as a driving wheel and a driven wheel respectively. A second drive chain 34 extends between the two chain wheels 32 and 33 and at its left it is also positively coupled to the slide-type support 18. Again the drive chain 34 can be a toothed belt and the driven wheel can be formed by a guide roller or guide wheel instead of by the chain wheel 32.

The two toothed-chain drives 29 to 34 are driven by a third toothed-chain drive coupled to the chain wheels 30 and 33 by a third drive chain. Obviously, it is possible to provide third chain wheels for the third drive chain, which wheels are locked in rotation to the chain wheels 30 and 33. The drive chains 31, 34 and 35 can be made of a plastic material, for example rubber.

The three toothed-chain drives are driven by an electric motor 36 whose drive shaft is locked in rotation to a worm 37. The worm 37 meshes with a worm wheel 38 which, together with the chain wheel 30, is locked in rotation to a spindle 39. The wiper of a potentiometer 40 is coupled to the spindle 39, enabling the instantaneous positions of the supports 17 and 18 on the rail-like guide members 19 and 20 to be derived from the wiper position of the potentiometer 40.

During threading-in, as already stated, the tape-guide elements 9 to 14 engage behind the magnetic tape 4 and the supports 17 and 18 are moved into an end position 41 in the directions indicated by the arrows 21 and 22. The magnetic tape 4 is then wrapped around the drum-shaped scanning device 1 along a helical path. During the threading movement of the tape the roller plates 15 and 16 are pivoted by cam-surface control. In the end position 41 the roller plates 15 and 16 abut against a stop (not shown).

The present arrangement of interlocked toothed-chain drives enables an oppositely directed synchronous movement of the first toothed-chain drive relative to the second toothed-chain drive to be obtained by means of a small number of cheap standard elements. The precisely operating tape-loading device can be arranged around the scanning device 1 in a space-saving manner. Since the positions of the movable tape-guide elements 9 to 14 at any point along the tape-threading path can be derived from the wiper position of the potentiometer 40 the electric motor 36 can be controlled exactly by means of a control device during threading-in and threading-out. This also applied in the case of initialisation of such a control device after a fault condition, for example a power failure.

We claim:

1. A magnetic-tape-cassette apparatus having a drum-shaped scanning device comprising a rotary magnetic head, first and second guides, and a tape-loading device comprising two supports having tape-guide elements engageable behind a magnetic tape accommodated in a magnetic-tape cassette, said supports being longitudinally moveable on said guides to extract the tape from the magnetic-tape cassette and wrap it at least partly around the drum-shaped scanning device, wherein the improvement comprises:

a first traction drive means with positive transmission for moving one of the supports on said first guide, said first drive means comprising a first driving wheel and a first driven wheel arranged at ends of the first guide and a first traction means which is looped about the first driving wheel and the first driven wheel and is positively coupled to the one of the two longitudinally movable supports, a second traction drive means with positive transmission for moving the other of the supports, said second drive means comprising a second driving wheel and a second driven wheel arranged at the ends of the second guide and a second traction means which is looped about the second driving wheel and the second driven wheel and is positively coupled to the other one of the two longitudinally movable supports, and a third traction drive means with positive transmission, said third drive means including a third traction means for driving a driving wheel of one of the first and second traction drive means, wherein the first, second, and third traction means are distinct elements independent of one another, and a motor for transmitting a torque to one of the driving wheels.

2. A magnetic tape apparatus as claimed in claim 1, characterised in that the third traction drive means comprises a third driving wheel and a third driven wheel locked in rotation to the first and the second driving wheels of the first and the second traction drive means, and the third traction means engages with the third driving wheel and driven wheel of the third traction drive means.

3. A magnetic tape apparatus as claimed in claim 1, characterised in that a worm is locked in rotation to a drive shaft of the motor and is in mesh with a worm wheel which is locked in rotation to one of the driving wheels (30, 33).

4. A magnetic tape apparatus as claimed in claim 3, characterised by a potentiometer which is driven by the drive shaft of the motor and from which the positions of the supports is derivable.

5. A magnetic tape apparatus according to claim 4, wherein said elongate guide members are straight rails.

6. A magnetic tape apparatus according to claim 1, wherein said elongate guide members are straight rails.

7. A magnetic tape apparatus as claimed in claim 2, characterized in that a worm is locked in rotation to a drive shaft of the motor and is in mesh with a worm wheel which is locked in rotation to one of the driving wheels.

8. A magnetic tape cassette apparatus according to claim 2, wherein each of said traction means consists of a respective chain and each of said driven wheels and said driving wheels are toothed for positively engaging a respective said chain.

9. A magnetic tape cassette apparatus according to claim 2, wherein each of said traction means consists of a respective toothed belt and each of said driven and driving wheels are toothed for positively engaging with a respective toothed belt.

10. A magnetic tape cassette apparatus according to claim 1, wherein each of said traction means consists of a respective chain and each of said driven wheels and said driving wheels are toothed for positively engaging a respective said chain.

11. A magnetic tape cassette apparatus according to claim 1, wherein each of said traction means consists of a respective toothed belt and each of said driven and driving wheels are toothed for positively engaging with a respective toothed belt.

12. A magnetic tape cassette apparatus, comprising:
  a) a drum shaped scanning device comprising a rotary magnetic head;
  b) first and second straight elongate guides each extending along a respective opposite side of said scanning device;
  c) first and second supports each including a tape guide element engageable behind a tape of a magnetic-tape cassette, each support being longitudinally moveable on a respective said guide to extract the tape from the magnetic tape cassette and wrap it around a portion of said scanning device;
  d) a first pair of rotatable wheels each located adjacent a respective opposing end of the first guide, and a first flexible looped drive element comprising one of a chain and a toothed belt and extending around both of said first pair of wheels and along both opposing sides of said first guide, said first support being fixed to said first flexible drive element so that rotation of said first flexible drive element about said first pair of rotatable wheels moves said first support along said first guide, one of said first pair of wheels being a toothed drive wheel in positive driving engagement with said drive element;
  e) a second pair of rotatable wheels each located adjacent a respective opposing end of the second guide, and a second flexible looped drive element comprising one of a chain and a toothed belt and extending around both of said second pair of wheels and along both opposing sides of said second guide, said second support being fixed to said second flexible drive element so that rotation of said second flexible drive element about said second set of wheels moves said second support along said second guides, the one of said second pair of wheels at the end of the second guide rail most proximate in position to said first drive wheel being a toothed drive wheel in positive driving engagement with said second flexible drive element;
  f) and a third flexible looped drive element extending about and being in positive drive engagement with both of said first and second toothed drive wheels; and
  g) drive means for rotatably driving one of said flexible looped logged drive elements, whereby the other two flexible looped drive elements are synchronously moved with said one drive element and said first and second supports are synchronously moved on said guides.

13. A magnetic tape cassette apparatus according to claim 12, wherein each of said guides are guide rails.

14. A magnetic tape cassette apparatus according to claim 12, wherein each of said flexible drive elements are toothed drive belts.

15. A magnetic tape cassette apparatus according to claim 12, wherein each of said flexible drive elements are chains and each of said driving wheels includes teeth in positive drive engagement with their respective chains.

16. A magnetic tape cassette apparatus according to claim 12, wherein said drive means comprises a motor for driving one of said drive wheels and sensing means for sensing the rotation of said motor to derive the synchronous position of said first and second supports.

17. A magnetic tape cassette apparatus according to claim 16, wherein said sensing means is a potentiometer connected to a shaft of said motor.

* * * * *